United States Patent Office 3,304,266
Patented Feb. 14, 1967

3,304,266
FOAM CONTROL AGENTS
Robert E. Sullivan, Bay City, Mich., assignor to Dow Corning Corporation, Midland, Mich., a corporation of Michigan
No Drawing. Filed May 6, 1963, Ser. No. 278,428
13 Claims. (Cl. 252—358)

This invention relates to improved foam control agents.

The use of water insoluble polyalkylene glycols as foam control agents is well known. Attempts to disperse silica in the water insoluble polyalkylene glycols have been unsuccessful because the resulting mixtures have been viscous, thixotropic, messes which are extremely difficult or impossible to use.

It has now been discovered that a foam control agent consisting essentially of silica and a water insoluble polyalkylene glycol prepared by heating the silica and the glycol while subjecting the mixture to a shearing action has better handling properties than similar compositions known heretofore. This result was completely unexpected.

It is believed that the heating and shearing action increases the hydrophobicity of the silica or in some manner alters the surface of the silica. However, the exact mode of operation is not known, and therefore, applicant does not wish to be bound to this theory.

It has also been discovered that a foam control agent having improved handling properties can be obtained by subjecting a mixture of a water insoluble polyalkylene glycol and a silica containing organosilyl groups or alkoxy groups on its surface, to a shearing action. Such silicas are well known materials and can be prepared, for example, by the processes set forth in U.S. Patents 3,015,645 and 3,024,126 and Canadian Patent 536,445, the disclosures of all of which are incorporated herein by reference. Such silicas are commonly referred to in the at as treated silicas.

It is difficult to set any meaningful numerical limitations on the length of time the mixture should be sheared and heated since this will not only be dependent on the particular silica and water insoluble polyalkylene alcohol involved, but will also be dependent upon the degree of improvement which one is willing to accept. Thus, if so desired, one can obtain a foam control agent by the process of this invention which has improved handling properties and that is satisfactory for a particular application, but which does not have the optimum obtainable handling properties. Therefore, the length of time which the mixture is sheared or sheared and heated can vary anywhere from a few minutes to a number of hours. The handling properties of the mixture improves the longer the mixture is sheared or sheared and heated until the point of optimum or maximum improvement is reached and then longer shearing or shearing and heating provides no additional useful benefits. By way of example, a mixture can be sheared or sheared and heated for anywhere from about 5 minutes to 5 hours or more.

When heating is employed, the mixture of the silica and the water insoluble polyalkylene glycol must be heated at a temperature at least high enough to drive off water from the silica, but at a temperature which is below the temperature at which the polyalkylene glycol will decompose. Thus, it is generally preferable to heat the mixture at a temperature of at least 100° C.

While the amount of silica employed in the foam control agent of this invention can vary, it is generally preferred that it contain 1 to 10 percent by weight of silica with 2 to 7 percent being a more preferred range. The silicas employed in the foam control agent of this invention, whether treated or untreated, have a surface area of at least 50 square meters per gram as measured by nitrogen adsorption in the method described in ASTM Special Technical Bulletin No. 51, page 95 et seq. (1941). Preferably the silica has a surface area of at least 150 square meters per gram.

When the silica employed is not treated the defoamers of this invention are prepared by mixing the silica and the glycol with a shearing action while at the same time heating the mixture. This method is preferred since the treated silicas are more expensive and pose some health hazards.

There are several commercially available pieces of equipment that can be used to shear the mixtures of this invention. One might mention by way of illustration the Eppenbach, the Shear-Flo and homogenizers. In the light of this disclosure other suitable shearing devices that can be used will be obvious to those skilled in the art.

Any water insoluble polyalkylene glycol can be used herein. Thus the molecular weight of the glycol is not critical nor is the size of the alkylene group. Specific examples of operative glycols are propylene glycols, butylene glycols, octylene glycols and octadecylene glycols.

In order that those skilled in the art can better understand how the present invention can be practiced, the following examples are given by way of illustration and not by way of limitation.

The viscosities in the examples below were measured with a Brookfield apparatus, Model LVT, using a number 3 spindle, 6 r.p.m. and a factor of 200.

*Example 1*

A mixture was prepared of 194 g. of polypropylene glycol having a molecular weight of about 2000 and 6 g. of silica having a surface area of about 225 square meters per gram, the surface of the silica being free of organosilyl groups. The mixture was thioxotropic and extremely viscous having an apparent viscosity of 15,000 cps. When the mixture was sheared for three hours on an Eppenbach mixer at 125° C. an improved foam control agent was obtained having an apparent viscosity of 400 cps.

*Example 2*

A mixture was prepared of 188 g. of polybutylene glycol having a molecular weight of about 2000 and 12 g. of silica having a surface area of about 225 square meters per gram, the surface of the silica being free of organosilyl groups. The mixture was thixotropic and extremely viscous having an apparent viscosity greater than 20,000 cps. When the mixture was sheared for 3 hours on an Eppenbach mixer at 125° C. an improved foam control agent having an apparent viscosity of 1,700 cps. was obtained.

*Example 3*

A mixture of 194 g. of a polypropylene glycol having a molecular weight of about 2000 and 6 g. of silica having trimethylsilyl groups on its surface was subjected to a strong shearing action. A foam control agent was obtained which had good handling properties and that did not become viscous.

*Example 4*

A mixture of 194 g. of a polypropylene glycol having a molecular weight of about 2000 and 6 g. of Estersil (a treated silica having isobutoxy groups on its surface) was subjected to a strong shearing action. A foam control agent was obtained which had good handling properties and that did not become viscous.

That which is claimed is:

1. A foam control agent consisting essentially of a mixture of 1 to 10 percent by weight of silica having a surface area of at least 50 square meters per gram and a water insoluble polyalkylene glycol, said agent having been prepared by heating the mixture at a temperature of at least 100° C. while subjecting the mixture to a shearing action whereby an improved foam control agent was obtained.

2. The foam control agent of claim 1 containing 2 to 7 percent by weight of silica having a surface area of at least 150 square meters per gram.

3. The foam control agent of claim 2 wherein the water insoluble polyalkylene glycol is a polypropylene glycol.

4. The foam control agent of claim 2 wherein the water insoluble polyalkylene glycol is a polybutylene glycol.

5. A foam control agent consisting essentially of a mixture of about 3 percent by weight of silica having a surface area of about 225 square meters per gram and about 97 percent by weight of a water insoluble polypropylene glycol, said agent having been prepared by heating the mixture at a temperature of at least 100° C. while subjecting the mixture to a shearing action whereby the improved foam control agent was obtained.

6. A foam control agent consisting essentially of a mixture of about 6 percent by weight of silica havnig a surface area of about 225 square meters per gram and about 94 percent by weight of a water insoluble polybutylene glycol, said agent having been prepared by heating the mixture at a temperature of at least 100° C. while subjecting the mixture to a shearing action whereby the improved foam control agent was obtained.

7. A foam control agent consisting essentially of a mixture of 1 to 10 percent by weight of a treated silica containing organosilyl groups or alkoxy groups on its surface and having a surface area of at least 50 square meters per gram and a water insoluble polyalkylene glycol, said agent having been prepared by subjecting the mixture to a shearing action whereby the improved foam control agent was obtained.

8. The foam control agent of claim 7 containing 2 to 7 percent by weight of the silica, said silica having a surface area of at least 150 square meters per gram.

9. The foam control agent of claim 8 wherein the water insoluble polyalkylene glycol is a polypropylene glycol.

10. The foam control agent of claim 8 wherein the water insoluble polyalkylene glycol is a polybutylene glycol.

11. A foam control agent consisting essentially of about 3 percent by weight of silica containing trimethylsilyl groups on its surface and about 97 percent by weight of a water insoluble polypropylene glycol, said agent having been prepared by subjecting the mixture to a shearing action whereby the improved foam control agent was obtained.

12. A foam control agent consisting essentially of about 3 percent by weight of silica containing trimethylsilyl groups on its surface and about 97 percent by weight of a water insoluble polybutylene glycol, said agent having been prepared by subjecting the mixture to a shearing action whereby the improved foam control agent was obtained.

13. A foam control agent consisting essentially of about 3 percent by weight of silica containing isobutoxy groups on its surface and about 97 percent by weight of a water insoluble polypropylene glycol, said agent having been prepared by subjecting the mixture to a shearing action whereby the improved foam control agent was obtained.

References Cited by the Examiner

UNITED STATES PATENTS

| | | | |
|---|---|---|---|
| 2,055,666 | 9/1936 | Moore et al. | 252—8.5 |
| 2,575,276 | 11/1951 | Jacoby et al. | 252—358 |
| 2,575,298 | 11/1951 | Ryznar | 252—358 |
| 2,894,913 | 7/1959 | Sullivan et al. | 252—358 |
| 3,004,921 | 10/1961 | Stossel | 252—309 |
| 3,015,645 | 1/1962 | Tyler | 260—46.5 |
| 3,113,930 | 12/1963 | Chevalier | 252—358 |

LEON D. ROSDOL, *Primary Examiner.*

JULIUS GREENWALD, *Examiner.*

H. B. GUYNN, *Assistant Examiner.*